United States Patent
Delfort et al.

(10) Patent No.: US 12,337,277 B2
(45) Date of Patent: Jun. 24, 2025

(54) METHOD FOR REGENERATING AN AQUEOUS SOLUTION OF MEG CONTAINING SALTS WITH PURGE TREATMENT

(71) Applicants: IFP Energies nouvelles, Rueil-Malmaison (FR); AXENS, Rueil-Malmaison (FR)

(72) Inventors: Bruno Delfort, Rueil-Malmaison (FR); Aurélie Wender, Rueil-Malmaison (FR); Elsa Muller, Rueil-Malmaison (FR); Xavier Courtial, Rueil-Malmaison (FR); Guillaume Parer, Rueil-Malmaison (FR); Pierre-Yves Lanfrey, Rueil-Malmaison (FR)

(73) Assignees: IFP Energies nouvelles, Rueil-Malmaison (FR); AXENS, Rueil-Malmaison (FR)

( * ) Notice: Subject to any disclaimer, the term of this patent is extended or adjusted under 35 U.S.C. 154(b) by 423 days.

(21) Appl. No.: 17/783,891

(22) PCT Filed: Dec. 1, 2020

(86) PCT No.: PCT/EP2020/084179
§ 371 (c)(1),
(2) Date: Jun. 9, 2022

(87) PCT Pub. No.: WO2021/115852
PCT Pub. Date: Jun. 17, 2021

(65) Prior Publication Data
US 2023/0023829 A1    Jan. 26, 2023

(30) Foreign Application Priority Data
Dec. 13, 2019   (FR) ..................................... 1914427

(51) Int. Cl.
*B01D 53/22*    (2006.01)
*B01D 53/26*    (2006.01)

(52) U.S. Cl.
CPC .... *B01D 53/263* (2013.01); *B01D 2252/2023* (2013.01)

(58) Field of Classification Search
CPC ...................... B01D 53/263; B01D 2252/2023
See application file for complete search history.

(56) References Cited

U.S. PATENT DOCUMENTS

| 5,993,608 A | 11/1999 | Abry et al. |
| 6,508,916 B1 | 1/2003 | Razzaghi et al. |

(Continued)

FOREIGN PATENT DOCUMENTS

| EP | 1261410 B1 | 9/2009 |
| EP | 2860168 B1 | 11/2020 |

(Continued)

OTHER PUBLICATIONS

International Search Report PCT/EP2020/084179 dated Mar. 2, 2021 (pp. 1-2).

*Primary Examiner* — Anthony R Shumate
(74) *Attorney, Agent, or Firm* — Ryan Pool (57) ABSTRACT

The present invention relates to a process for regenerating a rich MEG aqueous solution (100), recovering a maximum amount of MEG while at the same time removing the carboxylic acid salts, including:
  a) vacuum evaporation of the solution (100) in a unit (1000);
  b) optional precipitation in a tank (1002) of the inorganic salts of a portion (105) of the liquid residue enriched in MEG and in salts (104) obtained from a);
  c) removal of the precipitated inorganic salts in a solid/liquid separation unit (1003);

(Continued)

d) sending all or part (114) of the liquid effluent (112) obtained from c) into a separation unit (1004) different from the unit (1000) to form, notably, an MEG stream depleted in carboxylic acid salts or in carboxylic acids (115);

e) recycling of said stream (115) into step a).

14 Claims, 2 Drawing Sheets

(56) References Cited

U.S. PATENT DOCUMENTS

| | | |
|---|---|---|
| 7,232,505 B2 | 6/2007 | Laborie et al. |
| 9,284,244 B2 | 3/2016 | Deshmukh |
| 9,732,019 B1 | 8/2017 | Langley et al. |
| 10,005,708 B2 | 6/2018 | Messenger |
| 10,308,578 B2 | 6/2019 | Messenger |
| 10,934,237 B2 | 3/2021 | Messenger |
| 2005/0072663 A1 | 4/2005 | Laborie et al. |
| 2011/0101117 A1* | 5/2011 | Miyauchi ............ B01D 53/263 236/44 A |
| 2015/0119609 A1 | 4/2015 | Deshmukh |
| 2016/0193563 A1* | 7/2016 | Bumb ................ B01D 53/1493 252/192 |
| 2017/0036192 A1* | 2/2017 | Chin .................. B01D 53/1425 |
| 2017/0129835 A1 | 5/2017 | Arumugam et al. |
| 2017/0333831 A1* | 11/2017 | Chen ...................... C10K 1/143 |
| 2018/0001259 A1* | 1/2018 | Singh ................ B01D 53/1475 |
| 2018/0029963 A1 | 2/2018 | Langley et al. |
| 2021/0069634 A1* | 3/2021 | Cullinane .......... B01D 53/1425 |

FOREIGN PATENT DOCUMENTS

| | | |
|---|---|---|
| FR | 2743069 B1 | 3/1998 |
| FR | 2846323 B1 | 12/2004 |
| WO | 2007073204 A1 | 6/2007 |

* cited by examiner

METHOD FOR REGENERATING AN AQUEOUS SOLUTION OF MEG CONTAINING SALTS WITH PURGE TREATMENT

TECHNICAL FIELD

The present invention relates to the field of regenerating an aqueous solution of monoethylene glycol (MEG) containing dissolved salts used for transporting natural gas.

PRIOR ART

The natural gas exiting production wells is often associated with oil-reservoir water containing dissolved salts (sodium chloride, potassium chloride, calcium chloride, sodium bicarbonate, etc.). Natural gas is transported from the production site to a processing site by circulation in pipelines. Depending on the transportation conditions, and notably on the pressure and temperature, it is possible for the water contained in the natural gas to form hydrate plugs which can result in stoppage of production.

To avoid these problems, a hydrate inhibitor is generally injected into the transportation pipelines. MEG, also known as ethane-1,2-diol or ethylene glycol, is commonly used as a hydrate inhibitor in the transportation of natural gas, often saturated with water, from the production site to the processing site. MEG is conventionally injected into drilling wells to ensure safe transportation of the natural gas to the processing units. To do this, an aqueous solution containing between 70% and 95% by weight of MEG, known as purified MEG or "lean MEG", is used.

Once separated from the condensates and from the natural gas, the recovered aqueous phase forms a solution generally containing between 15% and 60% by weight of MEG, known as "rich MEG" or "rich MEG solution". The rich MEG solution is composed of purified MEG injected into the wellhead, underground formation water and salts originating from this formation, water derived from the condensation of the gas and traces of dissolved and free hydrocarbons. The rich MEG solution thus needs to be regenerated and desalinated in order to be able to be reused for injection into the drilling wellhead. The process enabling regeneration and desalination is generally known by the generic term "MEG reclaiming".

MEG enters the reclaiming process with impurities, for instance water, hydrocarbons, inorganic salts, for instance sodium chloride or potassium chloride, and salts derived from carboxylic acids, for instance sodium and potassium formates, acetates, propionates, butyrates, oxalates and glycolates. At the process outlet, the MEG has been regenerated/desalinated and is in the form of an MEG/water mixture that can be reinjected into the drilling wellhead, which is the aqueous solution including between 70% and 95% by weight of MEG known as purified MEG ("lean MEG"), also referred to in the present description as regenerated MEG solution.

MEG distillation systems for separating MEG from the mixture of water and MEG are known to those skilled in the art, these processes being termed MEG regeneration processes. In general, the systems of the prior art make it possible to obtain an aqueous solution containing between 70% and 95% by weight of MEG.

Moreover, if the salts are not removed from the rich MEG solution, regeneration of the MEG leads to concentration and accumulation of the salts, originating mainly from the underground formation water, in the regenerated MEG solution and in the recycling loops of the regeneration process. The accumulation of these salts is the cause of numerous operating problems, for instance clogging of the MEG regeneration facilities which may go as far as causing their shutdown. This is why MEG regeneration processes may include, in addition to the separation of the water from the MEG, a step of MEG desalination, in particular in processes operating at pressures below atmospheric pressure.

The rich MEG solution, containing water and dissolved salts, thus includes:
- salts which precipitate under conditions that are compatible with facilities for regenerating and desalinating rich MEG solutions, such as inorganic salts, for instance sodium chloride, potassium chloride, calcium chloride, sodium bicarbonate, etc.;
- salts which do not precipitate under conditions that are compatible with facilities for regenerating and desalinating rich MEG solutions, such as organic salts, for instance carboxylic acid salts of formate, acetate, propionate, butyrate, etc. type, originating from natural gas and/or from the underground formation water, and/or from MEG degradation.

The carboxylic acid salts are extremely soluble in aqueous MEG solutions, and do not precipitate at low concentration, unlike the inorganic salts. They may also be present in the aqueous MEG solution in the form of carboxylic acids, which are volatile, depending on the pH of the aqueous MEG solution under consideration. In contrast, in the form of salts, notably alkali metal, alkaline-earth metal or metal salts, the organic acid salts are not volatile.

Currently, the majority of the processes for regenerating and desalinating rich MEG solutions make it possible to remove the majority of the water by distillation and of the inorganic salts by precipitation.

However, the removal of the carboxylic acid salts remains problematic.

Once dissolved, the organic acid salts, notably the carboxylic acid salts, have a tendency to accumulate in the MEG solutions, notably in the recycling loops of the evaporation units of the regeneration and desalination facilities. The more dissolved/accumulated organic salts there are in the MEG solution, the more the viscosity of the solution increases. As such, when they accumulate in the process, the dissolved organic acid salts may cause setting of the MEG and thus lead to operating problems, or even to shutdown of the unit. The energy needed to be supplied during regeneration is also liable to increase.

It is thus necessary to control the concentration of dissolved carboxylic acid salts in the MEG evaporation loops during the functioning of the process so as to limit the increase in viscosity and prevent clogging of the facilities.

The possibility of controlling the salt content in the regeneration process by using purging is known to those skilled in the art. Said purging makes it possible to evacuate from the unit a portion of the dissolved and/or suspended salts by purging a stream comprising dissolved and/or suspended salts and also MEG. The amount of salts purged is adapted to maintain the concentration of dissolved and/or suspended salts during functioning and thus to avoid an increase in viscosity which can cause clogging of the facilities.

For example, patent EP 1261410 describes a facility and a process for purifying hydrate-formation inhibitors such as MEG. The management of the salts dissolved in the MEG solution is performed by means of purging: the MEG to be treated is sent to a flash vessel or a column operating under vacuum so as to separate a liquid stream at the bottom of the vessel (or column) comprising MEG and the salts, and at the top of the vessel (or column) an essentially gaseous stream comprising the water and the MEG. The stream of MEG and salts is partly heated to be recycled into the vessel (or column), and the other part is purged, the amount purged depending on the salt concentration. This purging makes it possible to prevent the saturation and precipitation of salts in the liquid stream of MEG and salts at the outlet of the vessel (or column). The head stream is distilled under vacuum to separate the water and the gases (at the top) and to recover the purified MEG (at the bottom) which is recycled on the natural gas field. U.S. Pat. No. 5,993,608 also discloses the possibility of performing similar purging on the liquid effluent derived from a vapor/liquid separation zone receiving the MEG solution.

However, such purging leads to a loss of MEG, which reduces the efficiency of the regeneration process.

The present invention relates to a process directed towards limiting the loss of MEG encountered during conventional purging performed to remove the organic acid salts from the system, and is directed towards limiting the accumulation of these salts in the facility.

Certain MEG purification methods which take into account the problem of the accumulation of the organic acid salts in the MEG solution are known.

Thus, U.S. Pat. No. 9,284,244 describes a method for precipitating and removing carboxylic acid salts from an MEG solution, which consists in forcing the precipitation of these salts by adding an antisolvent and also by adding a solution of inorganic salts comprising divalent cations. In said document, it is described that the performance is achieved due to the introduction of chemical compounds.

U.S. Pat. No. 9,732,019 describes a method for stripping certain carboxylic acids from a rich MEG solution, by placing the rich MEG solution in contact with a stripping gas in a stripping column. Said method concerns carboxylic acids and not their salts. According to said method, the entire stream of rich MEG solution to be regenerated is subjected to stripping.

OBJECTIVES AND SUMMARY OF THE INVENTION

The general aim of the present invention is to provide a process for regenerating and desalinating a rich MEG solution which makes it possible to recover a maximum amount of MEG to form the regenerated solution while at the same time removing the inorganic salts and at least part of the carboxylic acid salts present in the solution.

The present invention is thus directed in particular towards avoiding the harmful effects of an increase in the concentration of dissolved carboxylic acid salts in the MEG solution during its regeneration, in particular a substantial increase in viscosity which may lead to clogging or other operating problems in the regeneration facility.

In particular, the present invention is directed towards meeting at least one of the following objectives:
   at least partly, preferably totally, removing the carboxylic acid salts from the aqueous MEG solution during the steps of the regeneration process while at the same time maximizing the amount of recovered MEG serving to form the regenerated MEG solution;
   removing the carboxylic acid salts from the aqueous MEG solution during the steps of the regeneration process while at the same time maximizing the amount of recovered MEG serving to form the regenerated MEG solution, without the need to add chemical compounds or reagents which promote the precipitation of the carboxylic acid salts.

It has thus been demonstrated by the inventors that it is possible to achieve at least one of these objectives by treating the rich MEG aqueous solution in a regeneration and desalination process including a sequence of operations, notably operations suitable for removing each type of salt, i.e. inorganic salts and carboxylic acid salts, to provide a regenerated MEG solution.

Thus, to achieve at least one of the abovementioned objectives, among others, the present invention proposes, according to a first aspect, a process for regenerating an MEG solution containing water and dissolved salts, including the following steps:
   a) said solution is evaporated under vacuum in a first evaporation unit to produce a gaseous effluent including MEG and water, and a liquid residue enriched in MEG and in salts, a first portion of which is recycled into said first vacuum evaporation unit;
   b) a second portion of said liquid residue enriched in MEG and in salts is optionally sent into a tank in which the temperature of said second portion of said salt-enriched liquid residue is lowered so as to precipitate inorganic salts to form a stream enriched in precipitated salts, a first fraction of which is preferably recycled into the tank, and a stream depleted in precipitated salts recycled into the vacuum evaporation unit in step a);
   c) said second portion of said liquid residue enriched in MEG and in salts obtained from step a) or a second fraction of said stream enriched in precipitated salts obtained in step b) is sent, preferably intermittently, into a solid/liquid separation zone to separate a stream containing precipitated salts including inorganic salts and a liquid effluent including dissolved salts, among which are carboxylic acid salts;
   d) a portion or all of said liquid effluent obtained in step c) is sent, preferably intermittently, into a separation unit different from the first vacuum evaporation unit to perform a separation between the MEG and at least a portion of the carboxylic acid salts or of the carboxylic acids liable to produce said carboxylic acid salts and to form an MEG stream depleted in carboxylic acid salts and in carboxylic acids and a residual stream enriched in carboxylic acid salts or in carboxylic acids;
   e) said MEG stream depleted in carboxylic acid salts or in carboxylic acids is recycled into step a), or said MEG stream depleted in carboxylic acid salts or in carboxylic acids is mixed with the gaseous effluent including MEG and water obtained from step a), and said gaseous effluent including MEG and water obtained from step a) or said mixture is used to produce the regenerated MEG solution.

According to one or more implementations, in step e), the MEG stream depleted in carboxylic acid salts or in carboxylic acids obtained from step d) is recycled into step a).

A step f) of purifying the gaseous effluent obtained from step a) in a purification unit may also be performed to form a stream of water and the regenerated MEG solution, preferably including from 70% to 95% by weight of MEG.

This purification step f) may be a vacuum distillation, preferably performed at a pressure of between 0.01 MPa and 0.07 MPa.

According to one or more implementations, prior to step a), evaporation at atmospheric pressure of the MEG solution containing water and dissolved salts to be regenerated is performed in an initial evaporation unit, preferably at a temperature of between 100° C. and 155° C. and a pressure of between 0.1 MPa and 0.15 MPa, to produce a water-enriched gaseous effluent and a liquid residue enriched in MEG and in salts, all of which is sent into step a).

According to one or more implementations, step a) is performed at a temperature of between 120° C. and 155° C., and at a pressure of between 0.01 MPa and 0.07 MPa.

According to one or more implementations, step c) is performed at a temperature of between 50° C. and 90° C., and at atmospheric pressure, preferably at a pressure of between 0.1 MPa and 0.15 MPa.

According to one or more implementations, the second fraction of said stream enriched in precipitated salts obtained from the tank is sent into the solid/liquid separation unit intermittently, preferably if the concentration of inorganic salts of said stream enriched in precipitated salts is between 10% by weight and 50% by weight, preferably between 15% by weight and 30% by weight.

According to one or more implementations, the portion or all of said liquid effluent obtained in step c) is sent intermittently into the separation unit of step d).

According to one or more implementations, in step d), the separation unit is chosen from a second evaporation unit or a liquid/liquid extraction unit or a membrane separation unit or a unit for separation by acidification and stripping.

According to one or more implementations, in step d), the separation unit is a second evaporation unit, and the portion or all of said liquid effluent obtained in step c) is evaporated under vacuum to form a vapor enriched in MEG and depleted in carboxylic acid salts and a residual liquid effluent enriched in carboxylic acid salts.

An additional liquid or gaseous stream can be sent into said second evaporation unit to increase the amount of MEG recovered in the stream during step d), said stream being chosen from water, steam or an inert gas.

Advantageously, said step d) is performed at a temperature of between 120° C. and 155° C., and at a pressure of between 0.01 MPa and 0.07 MPa.

According to one or more implementations, in step d), the separation unit is a liquid/liquid extraction unit, and the portion of said liquid effluent obtained in step c) is placed in contact with an extraction liquid, preferably at a temperature of between 50° C. and 100° C. and at a pressure of between 0.1 MPa and 0.15 MPa, to form a liquid MEG stream depleted in carboxylic acid salts and a residual liquid stream enriched in carboxylic acid salts, including the majority of the extraction liquid.

According to one or more implementations, in step d), the separation unit is a membrane separation unit, and the portion of said liquid effluent obtained in step c) is placed in contact with one or more membranes, preferably at a temperature of between 50° C. and 100° C. and at a pressure of between 0.1 MPa and 0.15 MPa, to form a liquid MEG stream depleted in carboxylic acid salts and a residual liquid stream enriched in carboxylic acid salts.

According to one or more implementations, the separation unit is a unit for separation by acidification and stripping, and the portion of said liquid effluent obtained in step c) is acidified and said acidified liquid effluent is then stripped with a stripping gas, preferably nitrogen, preferably at a temperature of between 50° C. and 100° C. and at a pressure of between 0.1 MPa and 0.15 MPa, to form a liquid MEG stream depleted in carboxylic acids and a residual gaseous stream enriched in carboxylic acids.

Other subjects and advantages of the invention will become apparent on reading the description which follows of particular exemplary embodiments of the invention, which are given as non-limiting examples, the description being made with reference to the appended figures described below.

In the figures, the same references denote identical or analogous elements.

DESCRIPTION OF THE EMBODIMENTS

Figure 1:
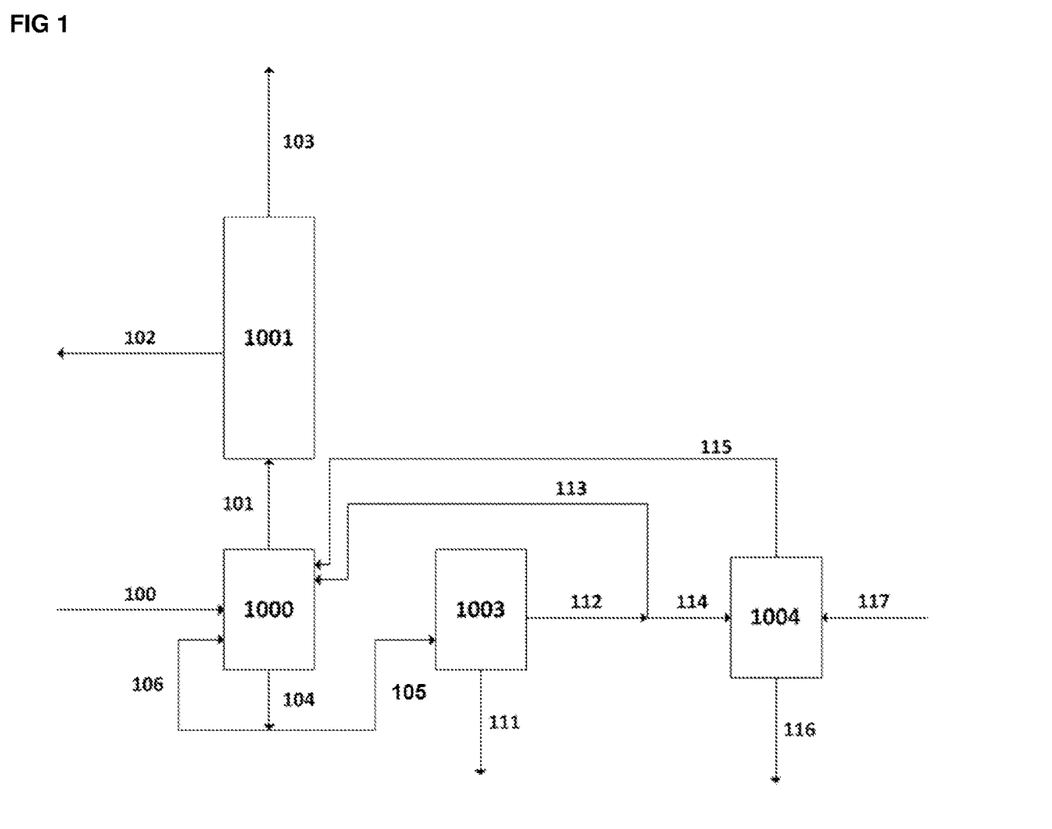
FIG. 1 is a scheme of the process for regenerating an MEG solution according to one embodiment of the invention.
Figure 2:
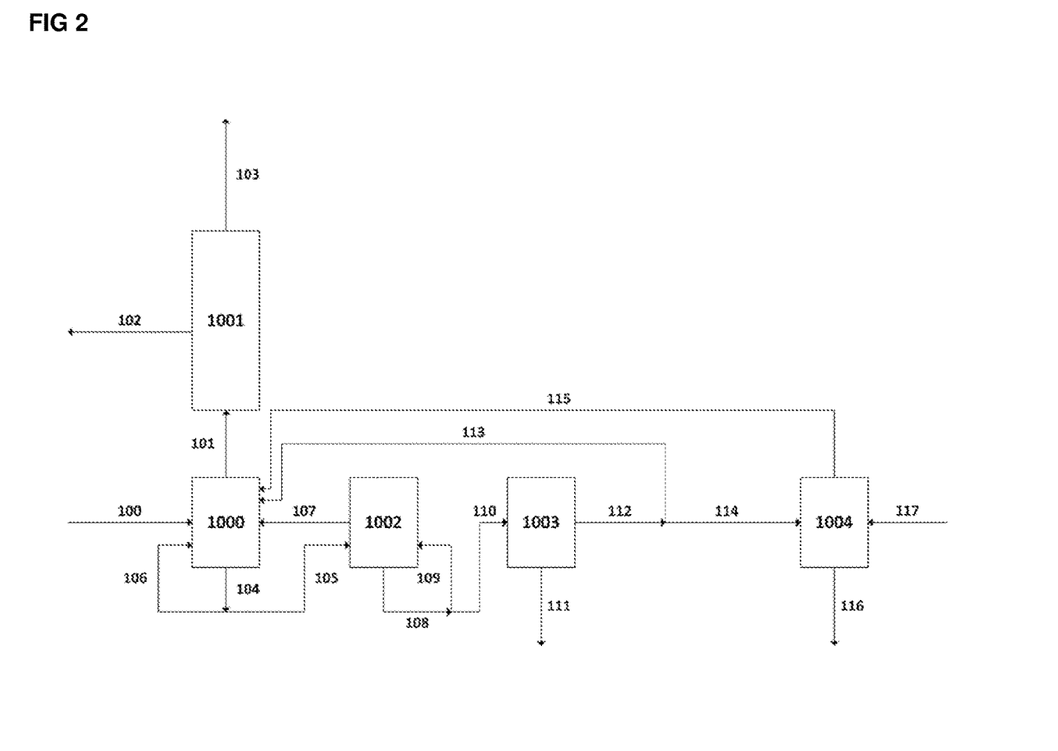
FIG. 2 is a scheme of the process for regenerating an MEG solution according to another embodiment of the invention.

Two embodiments of the process according to the invention are illustrated in FIGS. 1 and 2, and serve for the description hereinbelow of the process for better comprehension of the steps and of the various streams involved.

These illustrations of the process according to the invention do not include all of the components required for its implementation, for example the heat exchangers, pumps, mixers, etc. Only the elements necessary for the comprehension of the invention are shown herein, a person skilled in the art being capable of completing these representations to implement the invention.

The expression "between . . . and . . ." means that the limit values of the interval are included in the described range of values, unless otherwise mentioned.

Throughout the description, the sum of the mass fractions expressed as weight percentages of the various compounds of a solution is equal to 100% by weight of said solution.

The mass fractions of MEG and of water of a stream/effluent are expressed as weight percentages of the stream/effluent excluding salts, i.e. not taking the salts into account, unless otherwise specified.

In the present description, the steps are performed continuously, unless intermittent functioning thereof is specified.

In the present description, the pressures are expressed in absolute values, unless otherwise indicated.

In the present invention, the various ranges of parameters for a given step, such as the pressure ranges and the temperature ranges, may be used alone or in combination. For example, in the present invention, a range of preferred pressure values can be combined with a more preferred range of temperature values.

In the present description, the terms "enriched" and "depleted" in one or more compounds in an effluent/stream exiting a step should be understood relative to the concentration of said compound(s) in an entering effluent/stream. Thus, an MEG-enriched exiting stream means that the exiting stream has a higher MEG concentration than the MEG concentration of the entering stream. Similarly, a salt-depleted exiting stream contains a lower salt concentration than the salt concentration of the entering stream.

According to the invention, the process for regenerating an MEG solution containing water and dissolved salts includes, and may consist of, the following steps, preferably in this order:

a) vacuum evaporation of the MEG solution containing water and dissolved salts 100 in a first vacuum evaporation unit 1000. This vacuum evaporation makes it possible to produce a gaseous effluent including MEG and water 101, and a liquid residue enriched in MEG and in salts 104. A first portion 106 of the liquid residue enriched in MEG and in salts 104 is recycled into the first vacuum evaporation unit 1000.

b) Preferably, and as illustrated in FIG. 2, a second portion 105 of the liquid residue enriched in MEG and in salts 104 obtained from step a) is sent into a tank 1002, in which the temperature of the stream 105 is lowered so as to precipitate inorganic salts. This then results in a stream enriched in precipitated salts 108, of which a fraction 109 is preferably recycled into the tank 1002, and a stream depleted in precipitated salts 107 which is recycled into the vacuum evaporation unit 1000 in step a).

c) A second portion 105 of said liquid residue enriched in MEG and in salts 104 obtained from step a) as illustrated in FIG. 1 (in the case without step b)), or at least one fraction 110 of said stream enriched in precipitated salts 108 obtained in step b) as illustrated in FIG. 2, is sent, preferably intermittently, into a solid/liquid separation zone 1003 to separate a stream containing precipitated salts including inorganic salts 111 and a liquid effluent including dissolved salts, among which are carboxylic acid salts 112.

d) A portion 114 of the liquid effluent 112 obtained in step c) is sent, preferably intermittently, into a separation unit 1004 different from the first vacuum evaporation unit 1000 to perform a separation between the MEG and at least a portion of the carboxylic acid salts or of the carboxylic acids liable to produce said carboxylic acid salts of MEG. This then results in an MEG stream depleted in carboxylic acid salts or in carboxylic acids 115 and a residual stream enriched in carboxylic acid salts or in carboxylic acids 116.

e) The MEG stream depleted in carboxylic acid salts or in carboxylic acids 115 is recycled into step a), or the MEG stream depleted in carboxylic acid salts or in carboxylic acids 115 is mixed with the gaseous effluent including MEG and water 101 obtained from step a), and said gaseous effluent including MEG and water 101 obtained from step a) or said mixture is used to produce the regenerated MEG solution.

Advantageously, the regeneration process according to the invention also includes one or more additional steps:

a step of purifying the rich MEG solution 100, containing water and dissolved salts, prior to step a), in particular evaporation at substantially atmospheric pressure, to form a stream of water (water-enriched gaseous effluent) and an aqueous MEG solution depleted in water and containing salts, which is all sent into step a) (not shown in the figures);

and/or a step f) of purifying the gaseous effluent 101 obtained from step a) in a purification unit 1001 to form a stream of water 103 and a regenerated MEG solution 102, preferably including from 70% to 95% by weight of MEG.

Step f) is preferably a vacuum distillation, advantageously performed at a pressure of between 0.01 MPa and 0.07 MPa.

Rich MEG Solution 100 to be Regenerated

The aqueous MEG solution 100 to be regenerated contains dissolved salts, potentially up to several molar percent, which comprise inorganic salts, such as sodium chloride, potassium chloride, calcium chloride, sodium bicarbonate, etc., but which may also comprise organic salts, such as carboxylic acid salts, for example of the type such as formate ($HCOO^-$), acetate ($CH_3COO^-$), propionate ($C_2H_5COO^-$), butyrate ($C_3H_7COO^-$), etc.

The carboxylic acid salts are generally present in the aqueous MEG solution 100 to be regenerated, which enters the first vacuum evaporation unit 1000 in step a), and may originate from the natural gas and/or from the formation water. Thus, the process according to the invention is notably directed towards at least partly and preferably totally removing the carboxylic acid salts present in the rich MEG solution sent to the vacuum evaporation step a), and which accumulate during the regeneration process.

In the present description, the aqueous MEG solution 100 to be regenerated which contains dissolved salts is also known as the "rich" MEG solution.

The rich MEG solution 100 generally contains between 20% by weight and 50% by weight of MEG. The remainder of the solution is water, give or take the impurities.

The rich MEG solution may also contain other impurities, generally in small amount, from a few tens of molar ppm to a few molar percent, for example hydrocarbons derived notably from underground formations, and dissolved gases such as $CO_2$ or $H_2S$.

The inorganic salts may precipitate under the operating conditions of some of the process steps, in particular in the evaporation step a), but also in particular in step b) when this step is performed. They are separated from the rest of the solution of water and MEG in the solid/liquid separation step c), and removed from the process and from the regeneration facility.

The carboxylic acid salts, which essentially do not precipitate under the operating conditions of the process steps, are mainly separated from the rest of the solution of water and MEG and are removed from the process and from the facility in the separation step d).

The pH of the MEG solution 100 to be regenerated is preferably between 7 and 14, and typically from about 10.5 to 11. Such a pH may be obtained by adjusting the pH, for example by adding sodium hydroxide to the rich MEG solution prior to sending it to the vacuum evaporation unit 1000 in step a).

Such a pH prevents the carboxylic acid salts from being in the form of carboxylic acids, and prevents them from being evaporated with the water and the MEG during the evaporation step a).

The various steps of the process according to the invention are detailed below.

Vacuum Evaporation Step a)

During this step a), the rich MEG solution 100 is sent to the vacuum evaporation unit 1000 to be partially evaporated therein.

The vacuum evaporation unit 1000 may be any evaporation device that can be operated under vacuum known to those skilled in the art, for example a vessel, also sometimes known as an expansion (or "flash") vessel, due to the evaporation produced by the vacuum applied in the vessel and/or in the presence of a heating system. It may also be a vacuum distillation column.

This vacuum evaporation produces a gaseous effluent including, and preferably constituted by, MEG and water 101, and a liquid residue enriched in MEG and in salts 104. Specifically, the evaporation makes it possible to separate an MEG/water mixture, of which the gaseous effluent 101 is essentially composed, from the rest of the rich MEG solution 100 entering the unit 1000, optionally as a mixture with one or more recycling streams (107, 113, 115) of the process described later. Due to the evaporation, the salts, whether they are inorganic or organic, become concentrated in the liquid phase which is very rich in MEG (typically including between 50% by weight and 99% by weight of MEG, preferably between 70% by weight and 99% by weight of MEG, for example between 85% by weight and 99% by weight of MEG) contained in the vacuum evaporation unit 1000, and extracted from the unit 1000 in the form of the liquid residue enriched in MEG and in salts 104. The most volatile impurities ($CO_2$ and dissolved hydrocarbons) potentially present in the rich MEG solution 100 are also evaporated in the gaseous effluent 101.

The gaseous effluent 101 preferably contains substantially the same proportions of MEG and of water as the MEG solution 100 to be regenerated entering the unit 1000, due to the recycling streams (107, 113, 115) in the unit 1000. In particular, the gaseous effluent 101 preferably includes between 20% by weight and 50% by weight of MEG if the MEG solution 100 to be regenerated includes between 20% by weight and 50% by weight of MEG. The remainder with the MEG in the gaseous effluent 101 is water, give or take the impurities.

A first portion 106 of the liquid residue enriched in MEG and in salts 104 is recycled into the first vacuum evaporation unit 1000.

The salt concentration in the liquid residue 104 is preferably between 7% by weight and 30% by weight (of the liquid residue), all types of salts considered together, and more preferentially between 9% by weight and 12% by weight (of the liquid residue).

The concentration of inorganic salts in the internal recycling loop formed by the stream 106 is preferably between 5% by weight and 20% by weight, preferably between 9% by weight and 12% by weight. This concentration is preferably maintained in this range by the stream 105 originating from the unit 1000.

The concentration of organic salts is preferably less than 30% by weight of the liquid residue, more preferentially less than 10% by weight of the liquid residue, even more preferentially less than 3% by weight of the liquid residue, and even more preferably less than 1% by weight of the liquid residue.

A second portion of the liquid residue enriched in MEG and in salts 104 is sent either directly into the liquid/solid separation step c), as illustrated in FIG. 1, or into a step b) for concentrating and precipitating the salts in the form of the stream 105 as illustrated in FIG. 2.

Recycling of the first portion 106 of the liquid residue enriched in MEG and in salts 104 into the unit 1000 creates a recirculation loop, also known as an internal recycling loop, which makes it possible notably to control the salt content in the liquid residue enriched in MEG and in salts 104 by sending a second portion either into step c) (stream 105 of FIG. 1) or into step b) (stream 105 of FIG. 2).

Preferably, the second portion 105 of the liquid residue enriched in MEG and in salts 104, sent either directly into step c) or into step b), constitutes between 3% and 30% by weight of the liquid residue enriched in MEG and in salts 104, and more generally between 8% by weight and 12% by weight of the residue 104. For example, the second portion 105 of the liquid residue enriched in MEG and in salts 104, sent into step b), represents 10% by weight of the liquid residue enriched in MEG and in salts 104.

Step a) is preferably performed at a temperature of between 100° C. and 155° C., and at a pressure of between 0.01 MPa and 0.07 MPa.

The operating pressure in the unit 1000 may be obtained by means of a vacuum pump, typically placed downstream of the unit 1000, in the direction of circulation of the effluents exiting the unit 1000, for example downstream of the gaseous effluent 101, or alternatively downstream of the water stream 103 (steam) obtained from a distillation column 1001 receiving the gaseous effluent including water and MEG 101 when such a column is implemented. The operating temperature may be obtained by means of supplying heat via the first portion 106 of the liquid residue enriched in MEG and in salts 104 recycled into the unit 1000, which is passed beforehand through a heat exchanger (not shown) in order to be heated.

The gaseous effluent including MEG and water 101 is used to produce the regenerated MEG solution, either directly, notably when a step of purifying the rich MEG solution prior to step a) is performed (i.e. atmospheric distillation step), or indirectly, notably after an additional step f) of purifying said gaseous effluent 101 described later, where it is sent, alone or as a mixture with the stream 115 obtained from step d), and preferably alone.

Step b) of Precipitation of Inorganic Salts—Optional

The process is preferably performed with step b), as illustrated in FIG. 2.

In step b), a second portion 105 of the liquid residue enriched in MEG and in salts 104 obtained from step a) is sent into a tank 1002, in which the temperature of the stream 105 is lowered so as to precipitate inorganic salts.

Preferably, the sending of the second portion 105 of the liquid residue enriched in MEG and in salts 104 into the tank 1002 is performed continuously or intermittently, and preferably continuously.

This storage of a portion 105 of the liquid residue 104 in a tank 1002 and the lowering of its temperature brings about and/or increases the precipitation of its inorganic salts.

This then results in a stream enriched in precipitated salts 108 and a stream depleted in precipitated salts 107 which is recycled into the vacuum evaporation unit 1000 in step a).

A first fraction 109 of the stream enriched in precipitated salts 108 is preferably recycled into the tank 1002. A second fraction 110 of the stream enriched in precipitated salts 108, complementary to the first fraction 109, is sent into step c). The fraction sent into step c) depends on the solid/liquid separation system, and may be intermittent or continuous.

The second fraction 110 of the stream enriched in precipitated salts 108 sent into step c) may constitute up to the total amount of the stream enriched in precipitated salts 108 for intermittent functioning. However, when the solid/liquid separation system used in step c) operates with intermittent functioning, for example a solid/liquid separation system such as basket centrifuge filtration, it may be evaluated that less than 1% of the daily circulating stream 108 is sent to 1003.

The tank 1002 constitutes a zone for "passive" liquid/solid separation, by decantation: the precipitated salts in suspension accumulate at the bottom by gravity, whereas the liquid rises. It is this liquid which forms the stream depleted in precipitated salts 107 which is recycled into the vacuum evaporation unit 1000 in step a).

Preferably, the pressure in the tank 1002 is of the order of 0.1 MPa, for example between 0.05 MPa and 0.15 MPa, more preferentially between 0.08 MPa and 0.13 MPa, and the temperature is between 40° C. and 155° C., preferably between 55° C. and 70° C. A temperature, pressure or salt concentration gradient can be established in the tank 1002.

Preferably, the second fraction 110 of the stream enriched in precipitated salts 108 is sent into the solid/liquid separation unit 1003 intermittently.

This intermittent sending is advantageously performed if the inorganic salt concentration of the stream enriched in precipitated salts 108 is between 10% by weight and 50% by weight, preferably between 15% by weight and 30% by weight.

The intermittent sending of the fraction 110 into the solid/liquid separation unit may be triggered, for example, by means of controlling a parameter associated with the inorganic salt concentration of the stream 108, for example the density. A threshold density value corresponding to a minimum inorganic salt concentration value, for example 10%, or preferably 15%, or else a range of threshold density values corresponding to the inorganic salt concentration ranges mentioned above is determined, for example, and the sending of the fraction 110 into the unit 1003 is triggered when the density measured, for example by a densimeter, is above this threshold value or within the range of threshold values.

Non-intermittent, i.e. continuous, functioning for the sending of the second fraction 110 of the stream enriched in precipitated salts 108 in step c) is possible: the fraction 110 of the stream enriched in precipitated salts 108 may be sent continuously into the liquid/solid separation unit 1003 in step c).

Step c) of Liquid-Solid Separation for Removal of the Precipitated Inorganic Salts During this step c), the second portion 105 of the liquid residue enriched in MEG and in salts 104 obtained from step a), when the process does not include step b) as illustrated in FIG. 1, is sent, preferably intermittently, into a solid/liquid separation zone 1003 to separate a stream containing precipitated salts including inorganic salts 111 and a liquid effluent still including dissolved salts, among which are carboxylic acid salts 112.

Alternatively, when the process includes step b) as illustrated in FIG. 2, the second fraction 110 of the stream enriched in precipitated salts 108 obtained in step b) is sent, preferably intermittently, into the solid/liquid separation zone 1003 to separate a stream containing precipitated salts including inorganic salts 111 and a liquid effluent still including dissolved salts, among which are carboxylic acid salts 112.

This step allows the separation of the precipitated salts, mainly inorganic salts, from the rest of the liquid received in the unit 1003. This solid/liquid separation is performed via any means known to those skilled in the art, for example a filtration device or a centrifuge, preferably a centrifuge.

The stream containing the precipitated salts 111 comprises a salt cake composed exclusively of inorganic salts, and also a small amount of MEG and of water and dissolved salts (inorganic and organic at saturation). The concentration of inorganic salts of the stream 111 is, for example, between 80% by weight and 100% by weight, preferably between 85% by weight and 98% by weight, and more preferentially between 90% by weight and 95% by weight.

The liquid stream 112 exiting the solid/liquid separation unit 1003, e.g. a centrifuge, comprises MEG, water, dissolved inorganic salts to saturation, and dissolved carboxylic acid salts.

A portion 114 or all of the liquid effluent 112 is sent into the separation step d) for removal of the carboxylic acid salts described later. If only a portion 114 of the liquid effluent 112 is sent into the separation step d), the other portion 113 of the liquid effluent 112 is again sent into the unit 1000 in the vacuum evaporation step a).

Preferably, step c) is performed at a temperature of between 50° C. and 90° C. and at substantially atmospheric pressure. For example, the pressure is between 0.1 MPa and 0.15 MPa, preferably between 0.1 MPa and 0.12 MPa.

As already mentioned above, for FIG. 2, the sending of the second fraction 110 of the stream enriched in precipitated salts 108 into the liquid/solid separation unit 1003 is preferably performed intermittently.

For the embodiment illustrated in FIG. 1, which does not include step b), intermittent sending of the second portion 105 of the stream 104, obtained from the vacuum evaporation unit 1000, into the liquid/solid separation unit 1003 is also possible.

However, continuous functioning is possible, in which the liquid/solid separation unit 1003 continuously receives a liquid stream from which the crystallized salts are separated from the rest of the liquid stream, whether this liquid stream is the first fraction 110 of the stream 108 arriving from the tank 1002 (in the case of the embodiment illustrated in FIG. 2) or the second portion 105 of the liquid residue enriched in MEG and in salts 104 obtained from the vacuum evaporation unit 1000 in step a) (in the case of the embodiment illustrated in FIG. 1).

The choice of intermittent or continuous functioning for the sending of the liquid stream into the solid/liquid separation unit 1003 may depend on the technology used for the solid/liquid separation, for example the type of filtration system or centrifuge used.

Step d) of Separation for Removal of the Carboxylic Acid Salts or the Carboxylic Acids According to the invention, in step d), a portion 114 or all of the liquid effluent 112 obtained in step c) is sent into a separation unit 1004 different from the first vacuum evaporation unit 1000 to at least partly separate the carboxylic acid salts, or the carboxylic acids liable to produce said carboxylic acid salts, from the MEG, and to form an MEG stream depleted in carboxylic acid salts or in carboxylic acids 115 and a residual stream enriched in carboxylic acid salts or in carboxylic acids 116.

The separation unit 1004 is also different from the liquid/solid separation unit 1003 of step c). Specifically, it is intended for separating different compounds. Preferably, the separation unit 1004 is physically distinct from the vacuum evaporation unit 1000 and from the liquid/solid separation unit 1003.

Implementation of step d) in the process according to the invention makes it possible to treat an MEG stream 114 or 112 of reduced flow rate, compared with the stream 101, which makes it possible to reduce the size of the equipment.

In step d), the term "at least partial separation of the carboxylic acid salts, or of the carboxylic acids liable to produce said salts, from the MEG" means:

- either that only a portion of the total amount of the carboxylic acid salts is separated from the MEG, all types of carboxylic acid salts considered together, it being understood that the total amount is preferably separated ("at least"),
- or that only one subfamily of carboxylic acids liable to produce certain carboxylic salts is preferentially separated from the MEG. This latter case depends on the performance of the separation techniques and applies notably to the embodiment(s) in which step d) is performed by acidification of the MEG solution and stripping of the acidified solution as detailed later.

Preferably, the sending of a portion 114 or all of the liquid effluent 112 obtained in step c) into the separation unit 1004 is performed intermittently.

Preferably, all of the liquid effluent 112 obtained in step c) is sent intermittently to the separation unit 1004.

The liquid stream 112 exiting the solid/liquid separation unit 1003 comprises MEG, water, dissolved inorganic salts to saturation, and dissolved carboxylic acid salts. The content of dissolved carboxylic acid salts increases gradually over time to reach a threshold value.

Advantageously, this intermittent sending is performed if a parameter associated with the concentration of carboxylic acid salts in the liquid effluent 112, such as the dynamic viscosity, is greater than a given threshold value. For example, the sending of the portion 114 or all of the liquid effluent 112 into the separation unit 1004 may be triggered if the dynamic viscosity is greater than a threshold value corresponding to 3% by weight of carboxylic acid salts in the effluent 112, more preferentially 1% by weight of carboxylic acid salts. Preferably, the sending of the portion 114 or of all of the liquid effluent 112 into the separation unit 1004 is triggered for a concentration of carboxylic acid salts in the liquid effluent 112 of between 1% by weight and 30% by weight, preferably between 1% by weight and 10% by weight. A margin may be taken into account to determine the threshold viscosity value. Said threshold viscosity value, with the margin, is a value selected to prevent the liquid effluent 112 from becoming difficult to operate. When the viscosity of the liquid effluent reaches the threshold viscosity value, which means that the process is still operable due to the margin on the threshold value, the portion 114 or all of the liquid effluent 112 is sent into the separation unit 1004. If the required concentration is not reached, in particular if the threshold viscosity value is not reached, in the liquid effluent 112, the stream 114 is zero and all of the liquid effluent 112 can be recycled into the first vacuum evaporation unit 1000, in order gradually to increase the concentration of carboxylic acid salts in the liquid effluent 112.

Any means known to those skilled in the art may be used for evaluating the amount of carboxylic acid salts, for example measurement of the dynamic viscosity of the liquid effluent 112, such as vibrational or resonating viscometers.

According to one variant of intermittent functioning, a portion 114 of the liquid effluent 112 obtained in step c) is sent intermittently into the separation unit 1004, while another portion 113 is recycled into the unit 1000 in the vacuum evaporation step a) at the same time that the portion 114 is sent into step d).

However, continuous functioning is possible, in which the separation unit 1004 continuously receives a portion 114 of the liquid effluent 112. In practice, in the case of continuous implementation, a predetermined flow rate is established for the portion 114 of the liquid effluent 112 to be sent to the separation unit 1004.

Whereas the solid/liquid separation step c) is directed towards removing from the MEG stream the precipitated inorganic acid salts, step d) is directed towards removing the dissolved carboxylic acid salts, or certain carboxylic acids liable to form carboxylic acid salts, from said stream 114.

To do this, several ways of performing this step d) are possible.

In step d), the separation unit 1004 may be chosen from a second evaporation unit different from the first evaporation unit, or a liquid/liquid extraction unit or a membrane separation unit or a unit for separation by acidification and stripping.

Other technologies for performing the separation between the carboxylic acid salts (or the carboxylic acids liable to produce said carboxylic acid salts) and the MEG may be used without departing from the scope of the present invention, for example the implementation of ion-exchange resins.

According to a preferred implementation, the separation unit 1004 is a second vacuum evaporation unit, different from the first vacuum evaporation unit 1000. The portion 114 of the liquid effluent 112 obtained in step c) is evaporated under vacuum to form a vapor enriched in MEG and depleted in carboxylic acid salts 115, and a residual liquid effluent enriched in carboxylic acid salts 116.

According to this implementation, it is possible to send an additional stream 117 into the second evaporation unit to increase the amount of MEG recovered in the stream 115. Preferably, said additional stream 117 is water: a stream of water is sent into the second evaporation unit, which makes it possible notably to lower the operating temperature, thus promoting evaporation of the MEG and of the water and thus separation between the carboxylic acid salts and the MEG. This additional stream 117 may also be steam or an inert gas such as nitrogen or any other compound or mixture of compounds which improves the recovery of the MEG. According to this implementation, step d) is preferably performed at a temperature of between 120° C. and 155° C., and at a pressure of between 0.001 MPa and 0.05 MPa.

According to this implementation, the vacuum evaporation in step d) makes it possible to separate all of the carboxylic acid salts from the MEG recovered with the stream 115.

According to another implementation, the separation unit 1004 is a liquid/liquid extraction unit, and the portion 114 of the liquid effluent 112 obtained in step c) is placed in contact with an extraction liquid to form a liquid MEG stream depleted in carboxylic acid salts 115 and a residual liquid stream enriched in carboxylic acid salts 116, including the majority of the extraction liquid.

According to this implementation, the liquid/liquid extraction is preferably performed at a temperature of between 50° C. and 100° C., and at a pressure of between 0.1 MPa and 0.15 MPa, preferably between 0.1 MPa and 0.12 MPa.

Any extraction liquid that is capable of operating under these conditions may be used. The extraction liquid is advantageously insoluble with the portion 114 of the liquid effluent 112. The solubility of the organic salts in this extraction liquid allows separation by one-step or multi-step extractions.

According to yet another implementation, the separation unit 1004 is a membrane separation unit, and the portion 114 of the liquid effluent 112 obtained in step c) is placed in contact with one or more membranes to form a liquid MEG stream depleted in carboxylic acid salts 115 and a residual liquid stream enriched in carboxylic acid salts 116.

According to this implementation, the membrane separation is preferably performed at a temperature of between 50° C. and 100° C., and at a pressure of between 0.1 MPa and 0.15 MPa, preferably between 0.1 MPa and 0.12 MPa.

The membrane separation is generally performed by means of a motive force generated by a mechanical pressure difference on either side of a membrane having a pore size that is suitable for retaining the carboxylic acid salts on one side of the membrane. The membranes that may be used may correspond to those currently used for the separation of low molecular weight organic molecules, for the separation of electrolytes from non-electrolytes, for the separation of monovalent ions from divalent ions in aqueous solution, or for water desalination. The filtration during this membrane separation may be performed using a membrane that is permeable to carboxylic acid salts and impermeable to MEG. Alternatively, the filtration may be performed using a membrane that is permeable to MEG and impermeable to carboxylic acid salts.

According to another implementation, the separation unit 1004 is a unit for separation by acidification and stripping, and the portion 114 the liquid effluent 112 obtained in step c) is acidified and said acidified liquid effluent is then stripped with a stripping gas, preferably nitrogen or a gas including hydrocarbons, and more preferably nitrogen, to produce a liquid MEG stream depleted in carboxylic acids 115 and a residual gaseous stream enriched in carboxylic acids 116.

According to this implementation, the separation by acidification and stripping is preferably performed at a temperature of between 50° C. and 100° C., and at a pressure of between 0.1 MPa and 0.15 MPa, preferably between 0.1 MPa and 0.12 MPa.

This implementation makes it possible to achieve the stripping of a subfamily of carboxylic acids, short-chain carboxylic acids such as formic acid, acetic acid, propionic acid or butyric acid (total number of carbon atoms of less than 4).

The acidification advantageously results in a solution with a pH of less than 4, such that the organic acids of this subfamily thus remain in their acid form, and thus to promote the vaporizable form of such a subfamily of carboxylic acids. The pH of the solution may be controlled so as to conserve a pH of less than 4.

Step e) of Recovering the MEG Stream Obtained from Step d) and of Producing the Regenerated Solution In this step e), either the MEG stream depleted in carboxylic acid salts (or in carboxylic acids) 115 is recycled into the first vacuum evaporation unit 1000 in step a), or said MEG stream 115 is mixed with the gaseous effluent including MEG and water 101 obtained from step a) (not shown in the figures), and said gaseous effluent including MEG and water 101 obtained from step a) or said mixture is used to produce the regenerated MEG solution.

The choice between these two options (recycling into step a) or mixing with the effluent 101) depends on the impurity composition of the MEG stream 115, which itself depends on the type of separation used in step d).

Preferably, the MEG stream depleted in carboxylic acid salts (or in carboxylic acids) 115 is recycled into the first vacuum evaporation unit 1000 in step a). In this configuration, the inorganic salts that the stream may contain in dissolved form at saturation may again be removed in step a).

Production of the regenerated MEG solution may in effect be obtained indirectly from the gaseous effluent including MEG and water 101 obtained from step a) or from said mixture, either by implementing the purification step f) as described below (as shown in FIGS. 1 and 2), or by implementing the purification step f) and a step the step of evaporation at atmospheric pressure of the rich MEG solution to be regenerated prior to step a) also described below in the section relating to step f).

Production of the regenerated MEG solution may also be obtained directly (not shown in the figures) from the gaseous effluent including MEG and water 101 obtained from step a) or from said mixture, by implementing the step of evaporation at atmospheric pressure of the rich MEG solution to be regenerated prior to step a), described below in the section relating to step f).

The regenerated MEG solution preferably includes between 70% by weight and 95% by weight of MEG, or even between 70% by weight and 90% by weight of MEG.

This regenerated MEG solution does not contain any salts or possibly any residual salts in a content that is compatible with the specifications required for its re-use as hydrate inhibitor, typically less than 100 ppm by weight.

This solution may then once again be used as hydrate-formation inhibitor, for the production and transportation of natural gas, for example.

Step f) of Purifying the Gaseous Effluent Obtained from Step a)—Optional

This step f) is optional.

The process according to the invention is preferably performed with this step f).

The process may thus also comprise a step f) of purifying the gaseous effluent 101 obtained from step a) in a purification unit 1001 to form a stream of water 103 and the regenerated MEG solution 102, preferably including from 70% to 95% by weight of MEG. This regenerated MEG solution meets the specifications required for its re-use as a hydrate inhibitor.

The water stream 103 may be recovered in a reflux vessel, where a water/hydrocarbon separation may be performed if necessary.

Preferably, the purification step f) is a vacuum distillation in a vacuum distillation column, advantageously performed at a pressure of less than 0.1 MPa, preferably between 0.01 MPa and 0.07 MPa.

According to one embodiment, the purification unit 1001 may receive, instead of the gaseous effluent 101 alone, a mixture of the MEG stream 115 obtained from the separation step d) with the gaseous effluent 101 obtained from step a) if the composition of the stream 115 allows such a mixture, so as to produce the regenerated MEG solution 102.

According to one embodiment, when step f) is not performed, a step of evaporation at substantially atmospheric pressure of the rich MEG solution to be regenerated is performed prior to step a), in an initial evaporation unit, preferably at a temperature of between 100° C. and 140° C. and at a pressure of between 0.1 MPa and 0.15 MPa, preferably between 0.1 MPa and 0.12 MPa, to produce a water-enriched gaseous effluent and a liquid residue enriched in MEG and in salts, all of which is sent into step a).

According to one embodiment, the process includes both said step of the evaporation at substantially atmospheric pressure of the rich MEG solution to be regenerated prior to step a), and step f) of purifying the gaseous effluent obtained from step a).

According to a preferred implementation of the invention, the process includes the following steps:
a) the solution 100 is evaporated under vacuum in the first vacuum evaporation unit 1000 to produce the gaseous effluent including MEG and water 101, and the liquid residue enriched in MEG and in salts 104, a first portion 106 of which is recycled into the first vacuum evaporation unit 1000;
b) a second portion 105 of said liquid residue enriched in MEG and in salts 104 is sent into the tank 1002 in which the temperature of said second portion 105 is lowered so as to precipitate inorganic salts to form the stream enriched in precipitated salts 108, a first fraction 109 of which is preferably recycled into the tank 1002, and the stream depleted in precipitated salts 107 recycled into the vacuum evaporation unit 1000 in step a);
c) a second fraction 110 of said stream enriched in precipitated salts 108 obtained in step b) is sent, preferably intermittently, into the solid/liquid separation zone 1003, preferably including a centrifuge, to separate the stream containing precipitated salts including inorganic salts 111 and the liquid effluent including dissolved salts, among which are carboxylic acid salts 112;

d) all of said liquid effluent 112 obtained in step c) is sent intermittently into a second evaporation unit 1004, different from the first evaporation unit 1000, said second evaporation unit 1004 preferably being operated at a temperature of between 120° C. and 155° C., and at a pressure of between 0.01 MPa and 0.07 MPa, and said liquid effluent 112 is evaporated to form a vapor enriched in MEG and depleted in carboxylic acid salts 115 and a residual liquid effluent enriched in carboxylic acid salts 116;

e) said vapor enriched in MEG and depleted in carboxylic acid salts 115 is recycled into step a), and said gaseous effluent including MEG and water 101 obtained from step a) is used to produce the regenerated MEG solution.

According to this preferred implementation, a purification step f) is performed in a unit 1001 for purifying the gaseous effluent including MEG and water 101, to form a stream of steam 103 and the regenerated MEG solution 102, preferably including from 70% to 95% by weight of MEG, said purification step being a vacuum distillation, preferably performed at a pressure of between 0.01 MPa and 0.07 MPa. The process according to the invention, via the described sequence of steps, thus advantageously makes it possible to recover a maximum amount of MEG during the regeneration of the rich MEG solution, while at the same time removing the inorganic salts and at least part of the carboxylic acid salts present in the solution.

The invention claimed is:

1. Process for regenerating a solution of monoethylene glycol (MEG) containing water and dissolved salts, including the following steps:
   a) evaporating said solution (100) under vacuum in a first evaporation unit (1000) to produce a gaseous effluent including MEG and water (101), and a liquid residue enriched in MEG and in salts (104), and recycling a first portion (106) of said liquid residue enriched in MEG and in salts (104) into said first vacuum evaporation unit (1000);
   c) sending a second portion (105) of said liquid residue enriched in MEG and in salts (104) obtained from step a) into a solid/liquid separation zone (1003) to separate a stream containing precipitated salts including inorganic salts (111) and a liquid effluent including dissolved salts, among which are carboxylic acid salts (112);
   d) sending a portion (114) or all of said liquid effluent (112) obtained in step c) into a second evaporation unit (1004) different from the first vacuum evaporation unit (1000) to perform a separation between the MEG and at least a portion of the carboxylic acid salts and evaporating said portion (114) or all of said liquid effluent (112) obtained in step c) under vacuum to form a vapor enriched in MEG and depleted in carboxylic acid salts (115) and a residual liquid effluent enriched in carboxylic acid salts (116);
   e) recycling said vapor enriched in MEG and depleted in carboxylic acid salts (115) into step a), or mixing said vapor enriched in MEG and depleted in carboxylic acid salts (115) with the gaseous effluent including MEG and water (101) obtained from step a), and using said gaseous effluent including MEG and water (101) obtained from step a) or said mixture to produce the regenerated MEG solution.

2. Process according to claim 1, in which, in step e), the vapor enriched in MEG and depleted in carboxylic acid salts (115) obtained from step d) is recycled into step a).

3. Process according to claim 2, in which a step f) of purifying the gaseous effluent (101) obtained from step a) is also performed in a purification unit (1001) to form a stream of water (103) and the regenerated MEG solution (102).

4. Process according to claim 3, in which the purification step f) is a vacuum distillation.

5. Process according to claim 1, in which, prior to step a), evaporation at atmospheric pressure of the MEG solution containing water and dissolved salts (100) to be regenerated is performed in an initial evaporation unit, to produce a water-enriched gaseous effluent and a liquid residue enriched in MEG and in salts, all of which is sent into step a).

6. Process according to claim 1, in which step a) is performed at a temperature of between 120° C. and 155° C., and at a pressure of between 0.01 MPa and 0.07 MPa.

7. Process according to claim 1, in which step c) is performed at a temperature of between 50° C. and 90° C., and at atmospheric pressure.

8. Process according to claim 1, in which the portion (114) or all of said liquid effluent (112) obtained in step c) is sent intermittently into the separation unit (1004) of step d).

9. Process according to claim 1, in which an additional liquid or gaseous stream (117) is sent into said second evaporation unit to increase the amount of MEG recovered in the stream (115) during step d), said stream being chosen from water, steam or an inert gas.

10. Process according to claim 1, in which step d) is performed at a temperature of between 120° C. and 155° C., and at a pressure of between 0.01 MPa and 0.07 MPa.

11. Process according to claim 1, further comprising the following step b) preceding step c):
   b) sending the second portion (105) of said liquid residue enriched in MEG and in salts into a tank (1002) in which the temperature of said second portion (105) of said salt-enriched liquid residue is lowered so as to precipitate inorganic salts to form a stream enriched in precipitated salts (108), recycling a first fraction (109) of said stream enriched in precipitated salts (108) into the tank (1002), and recycling a stream depleted in precipitated salts (107) into the vacuum evaporation unit (1000) in step a).

12. Process according to claim 11, in which, in step c), a second fraction (110) of said stream enriched in precipitated salts (108) obtained from the tank (1002) is sent into the solid/liquid separation unit (1003).

13. Process according to claim 12, in which, the second fraction (110) of said stream enriched in precipitated salts (108) obtained from the tank (1002) is sent into the solid/liquid separation unit (1003) intermittently.

14. Process according to claim 12, in which, in which, the second fraction (110) of said stream enriched in precipitated salts (108) obtained from the tank (1002) is sent into the solid/liquid separation unit (1003) intermittently if the concentration of inorganic salts of said stream enriched in precipitated salts (108) is between 10% by weight and 50% by weight.

* * * * *